United States Patent [19]
Asada

[11] Patent Number: 5,629,606
[45] Date of Patent: May 13, 1997

[54] BATTERY CHARGING DEVICE FOR VEHICLE

[75] Inventor: Tadatoshi Asada, Anjo, Japan

[73] Assignee: Nippondenso Co., Ltd., Kariya, Japan

[21] Appl. No.: 569,506

[22] Filed: Dec. 8, 1995

[30] Foreign Application Priority Data

Dec. 28, 1994 [JP] Japan ................................. 6-328404
Sep. 22, 1995 [JP] Japan ................................. 7-244748

[51] Int. Cl.[6] ........................................ H02P 9/00
[52] U.S. Cl. ............................ 322/28; 322/36; 324/433; 320/61; 320/64
[58] Field of Search ............................. 322/14, 28, 33, 322/36; 320/61; 324/433

[56] References Cited

U.S. PATENT DOCUMENTS

| | | | |
|---|---|---|---|
| 4,543,521 | 9/1985 | Morishita et al. | 320/64 |
| 4,608,639 | 8/1986 | Morishita et al. | 364/424 |
| 4,618,811 | 10/1986 | Mashino et al. | 322/28 |
| 4,672,297 | 6/1987 | Gotoh et al. | 322/28 |
| 4,686,446 | 8/1987 | Nishimura et al. | 322/33 |
| 4,689,545 | 8/1987 | Komurasaki et al. | 322/14 |
| 4,733,159 | 3/1988 | Edwards et al. | 323/282 |
| 4,789,817 | 12/1988 | Asakura et al. | 322/28 |
| 5,087,869 | 2/1992 | Kuriyama et al. | 322/15 |
| 5,252,926 | 10/1993 | Menegoli | 324/545 |
| 5,256,959 | 10/1993 | Nagano et al. | 322/25 |

FOREIGN PATENT DOCUMENTS

| | | |
|---|---|---|
| 2-111233 | 4/1990 | Japan . |
| 5-268733 | 10/1993 | Japan . |
| 6-081431 | 10/1994 | Japan . |

*Primary Examiner*—Steven L Stephan
*Assistant Examiner*—Nicholas Ponomarenko
*Attorney, Agent, or Firm*—Cushman, Darby & Cushman IP Group of Pillsbury Madison & Sutro LLP

[57] ABSTRACT

A generator for vehicle is connected to an end of a transmitting wire through a generator-side signal transmitting and receiving circuit which has a transistor and a comparator. An ECU is connected to the other end of the transmitting wire through a vehicle-side signal transmitting and receiving circuit which has a switching transistor and a comparator. The comparator receives frequency signals from the transistor, and the comparator receives a voltage signal from the transistor. Thus, the generator control signal and the generator condition signal are transmitted by the same transmitting wire.

29 Claims, 8 Drawing Sheets

BATTERY CHARGING DEVICE FOR VEHICLE

CROSS REFERENCE TO RELATED APPLICATION

The present application is based on and claims priority from Japanese Patent Applications Hei 6-328404 filed on Dec. 28, 1994, and Hei 7-244748 filed on Sep. 22, 1995, the contents of which are incorporated herein by reference.

BACKGROUND OF THE INVENTION

1. Field of the Invention

The present invention relates to a battery charging device for a vehicle which provides a signal representing battery charging condition and is controllable at any time from the outside.

2. Description of Related Art

Recently, the battery charging device is required to serve various purposes such as reduction in the fuel consumption, the active shock absorbing, improvement in the vehicle drive performance, reduction in the engine idling speed and high power devices including an electrically heated catalyst (EHC) unit. As a result, the battery charging device is required not only to maintain the battery charging voltage at a desired level but also to change the generator condition according to load conditions and vehicle running conditions. For this purpose, it is necessary to provide signals representing generator conditions in real time.

Such generator conditions include the generator output signals such as output current, output power, field current, duty ratio of a field current control transistor or the like, generator output power such as battery charging voltage, battery voltage and stator phase voltage and temperature of the generator. The above conditions are detected by the amount representing the generator conditions, changes in the amount indexes and/or the like. The generator is controlled to change the amount of the generator conditions and/or changes in the amount, or by limiting or by restricting maximum or minimum indexes of the generator conditions within designated values.

For example, when temperature of the engine is lower than a designated value and the engine operation is unstable, the generator output power or torque is controlled to be low to prevent the engine from stalling. When temperature of the generator is higher than a designated temperature, the generator output is controlled to prevent further temperature rise. The above control is carried out by an outside ECU (electronic control unit) which controls a switching transistor to change the duty ratio of the field exciting current.

In order to provide the outside control and monitoring by the ECU, a wired signal carrying system has been proposed. Such system includes a generation control signal transmitting wire which transmits generation control signals from an outside ECU to a voltage regulator of the generator and a generator condition signal transmitting wire.

However, the above wired signal transmitting system has the following problem.

That is, the two transmitting wires makes the vehicle wire harness bulky and heavier and increase the number of connector terminals and connector size, resulting in increase of the regulator size which causes difficulty of the installation thereof and in the production cost thereof. The increase of the number of wires increases the possibility of disconnection of the transmitting wires or of contacting with the body earth or battery due to vehicle vibration, resulting in erroneous operation of the battery charging system. The increase of the connector terminals also increases possibility of subjecting themselves to the electrostatic surge voltage generated by the human body at installation work.

When the above transmitting wires are disposed in the device as a band cable or parallel cables, the cross talk increases and SN ratio decreases. Further, since the electromagnetic noise in the engine room is significant, it may cause erroneous operation or detection if the electromagnetic noise overlaps the cross talk.

SUMMARY OF THE INVENTION

The present invention is made in view of the above problem and to provide an inexpensive and reliable battery charging device which combines the outside control signal transmitting wire and the generator condition signal transmitting wire into a single transmitting wire with an improved interface between the regulator and the ECU and improved transmitting signals thereof.

Another object of the invention is to provide a battery charging device which has a simple control circuit maintaining high S/N ratio of the transmitting signals.

Another object of the present invention is to provide a battery charging device, in which an output terminal of a generator control signal transmitting means (hereinafter referred to as control signal sender) and an input terminal of a generator condition signal receiving means (hereinafter referred to as condition signal receiver) are connected to a common transmitting wire, an input terminal of a generator control signal receiving means (hereinafter referred to as control signal receiver) and an output terminal of a generator condition signal transmitting means (hereinafter referred to as condition signal sender) are connected to a generator-side terminal of the transmitting wire. The control signal sender transmits the generator control signal to the control signal receiver through the transmitting wire, the control signal receiver transmits the received signal to a generator voltage regulating means (hereinafter referred to as voltage regulator), and the voltage regulator controls the generator according to the generator control signal when receives. The condition signal sender transmits the generator condition signal to the condition signal receiver through the common transmitting wire, and the condition signal receiver transmits the received signal to an ECU. The ECU, therefore, can monitor the generator condition.

If the transmitting wire is disconnected due to vehicle vibration or the like, the input voltage of the vehicle-side condition signal receiver is changed to a specific voltage by an output stage of the control signal sender. Accordingly, the above disconnection can be detected by the outside ECU through the condition signal receiver as stated above. That is, no extra circuit, signal wire, specific input terminal or interface of the ECU is necessary to detect the disconnection. The ECU deals with the problem when detects the disconnection. Since only a single transmitting wire is used, the circuit can be made simple. Since no wire harness of parallel wires for the generator condition signal and the generator control signal is necessary, lowering of S/N ratio caused by the parallel wires can be eliminated, ensuring highly reliable signal transmission. In addition, since the different type of signals such as the voltage signal and the frequency signal are used, deterioration of the S/N ratio due to the crosstalk between the parallel wires with the same type of signals as mentioned above can be avoided.

A further object of the present invention is to provide a battery charging device, in which a transmitting-wiredisconnection-detecting means is provided to detect disconnection of the transmitting wire by comparison between the generator condition signal (which is received from the condition signal receiver) and the generator control signal. Therefore, the disconnection can be detected and displayed on a display device as an alarm.

A further object of the present invention is to provide a battery charging device in which the output stage of the control signal sender is composed of an output power switch, and the load thereof connected to the generator-side transmitting wire.

If the disconnection takes place, the voltage of the transmitting wire is set to high or low voltage of the voltage source through the conducting load resistor when the power switch is turned on, and through the nonconducting resistor when the switch is turned off. As a result, the ECU can recognize the disconnection by detecting the fact that the voltage received from the signal receiver does not change although the ECU sends a command signal to change the voltage of the transmitting wire.

A further object of the present invention is to provide a battery charging device in which the generator control signal voltage is set equal to the source voltage (to be connected to the load resistor) when no command signal is applied so that the voltage regulator can carry out the normal voltage regulation although the outside voltage control is not available. Thus, the generation stop or uncontrolled generation may not take place.

A further object of the present invention is to provide a battery charging device in which a PWM control signal (which is a frequency signal) is adopted as the generator control signal and the on-duty ratio of the PWM control signal is applied to the exciting current switching transistor when the generator is controlled by the outside ECU. Therefore, very simple modulation and demodulation of the generator control signal and the generator condition signal, and also very simple circuit can be provided as compared to the ordinary two way wired communication system.

That is, demodulation of the generator control signal is not necessary at the generator-side. Since the generator control signal is transmitted by the frequency signal, the transmitting system which is much simpler and does not require modulation or demodulation can be used.

Still another object of the present invention is to provide a battery charging device in which the amplitude of the PWM control signal voltage (which is the generator control signal) is modulated to transmit the generator condition signal. Thus, the circuit for modulation and demodulation of both signals can be simplified.

Another object of the present invention is to provide a battery charging device in which DC signal voltage (which is the generator condition signal) is combined to the PWM control signal voltage (which is the generator control signal) to transmit the generator condition signal. Thus, the circuit for modulation and demodulation of both signals can be simplified.

Another object of the present invention is to provide a battery charging device in which the condition signal sender has an output circuit having a fixed impedance which composes a load element of the output power switch of the control signal sender.

Since the generator is controlled by the outside ECU only when the battery voltage is higher than a fixed threshold value, the output impedance element of the condition signal sender can function as the load resistor for the output power switch of the control signal sender, thereby simplifying the circuit structure.

A further object of the present invention is to provide a battery charging device in which the condition signal sender functions as PWM-control switch of the exciting current of the voltage regulator, the circuit structure become further simpler.

A further object of the present invention is to provide a battery charging device in which a combined signal of the generator condition signal and the generator control signal is composed of a DC voltage signal component and a PWM signal component. Therefore, it is very simple to modulate the signals and to demodulate the combined signal to obtain the generator condition signal and the generator control signal. Thus, the circuit structure of the condition signal receiver and the control signal receiver can be simplified.

A still further object of the present invention is to provide a battery charging device which further includes a generator control signal holding circuit that holds the generator control signal received by the control signal receiver and applies the generator control signal to the voltage regulator. Therefore, the vehicle-side ECU is not always required to transmit the generator control signal when it is controlled by the outside ECU. In addition, when the generator control is required, the generator control signal is kept transmitted by the generator side until the next generator control signal is transmitted. Accordingly, the task of a microcomputer installed in the ECU is reduced, so that inexpensive microcomputer is available or performance can be increased.

A still further object of the present invention is to provide a battery charging device in which the transmitting wire is supplied with power by either the condition signal sender or the control signal sender, and a load element is connected in parallel with the output power switch (which is a driver element of the other one of the condition signal sender and the control signal sender). Thus, when the transmitting wire is disconnected from the generator-side terminal, the generator-side terminal voltage becomes approximately equal to the generator control signal voltage for the normal self control generator condition, so that battery overcharging or battery draining can be prevented even if the disconnection prevents the outside control of the vehicle-side ECU. Thus, a safe and reliable battery charging device for a vehicle is provided.

A still further object of the present invention is to provide a battery charging device in which the generator condition signal is a signal corresponding to the PWM signal (that is provided by the voltage regulator for PWM-control of the exciting current). The PWM signal can be transmitted by the condition signal sender when the vehicle-side ECU monitors the generator load condition, so that the signal can be transmitted to the transmitting wire without using complicated signal modulation circuit.

A still further object of the present invention is to provide a battery charging device in which the generator control signal includes a signal corresponding to voltage regulated by the voltage regulator. When the vehicle is accelerated, the voltage regulated by the voltage regulator is set lower than the voltage of the normal vehicle running so that the generator power during vehicle acceleration is set lower than the normal output power to reduce the engine load, thereby improving acceleration performance of the vehicle. When the vehicle is decelerated, the generator voltage is regulated to be higher than the normal voltage so that the vehicle running inertia can be utilize to the regeneration. As a result, the fuel consumption is improved and the ECU is not required to monitor the generator voltage, thereby reducing the task of the ECU.

A still further object of the present invention is to provide a battery charging device in which the generator control signal limits a maximum duty ratio of the exciting current of the voltage regulator (for PWM control of the exciting current). Therefore, excessive generation while the engine is still cold can be prevented and torque of the generator when the engine is idling or running at a low speed can be limited, thereby preventing the engine stall or the like.

A still further object of the present invention is to provide a battery charging device in which the generator control signal is a signal corresponding to an amount of change of the exciting-current on-duty of the voltage regulator (for the PWM control of the exciting current). The amount of change can be switched over in response to the vehicle running condition, and can be limited when the engine is idling or running at a low speed, so that the engine stall or the like can be prevented.

In addition, since the amount of change of the exciting-current on-duty can be controlled to correspond to the change in the electric load, unexpected reduction in the generator output voltage can be prevented and flickering of the head light is prevented.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
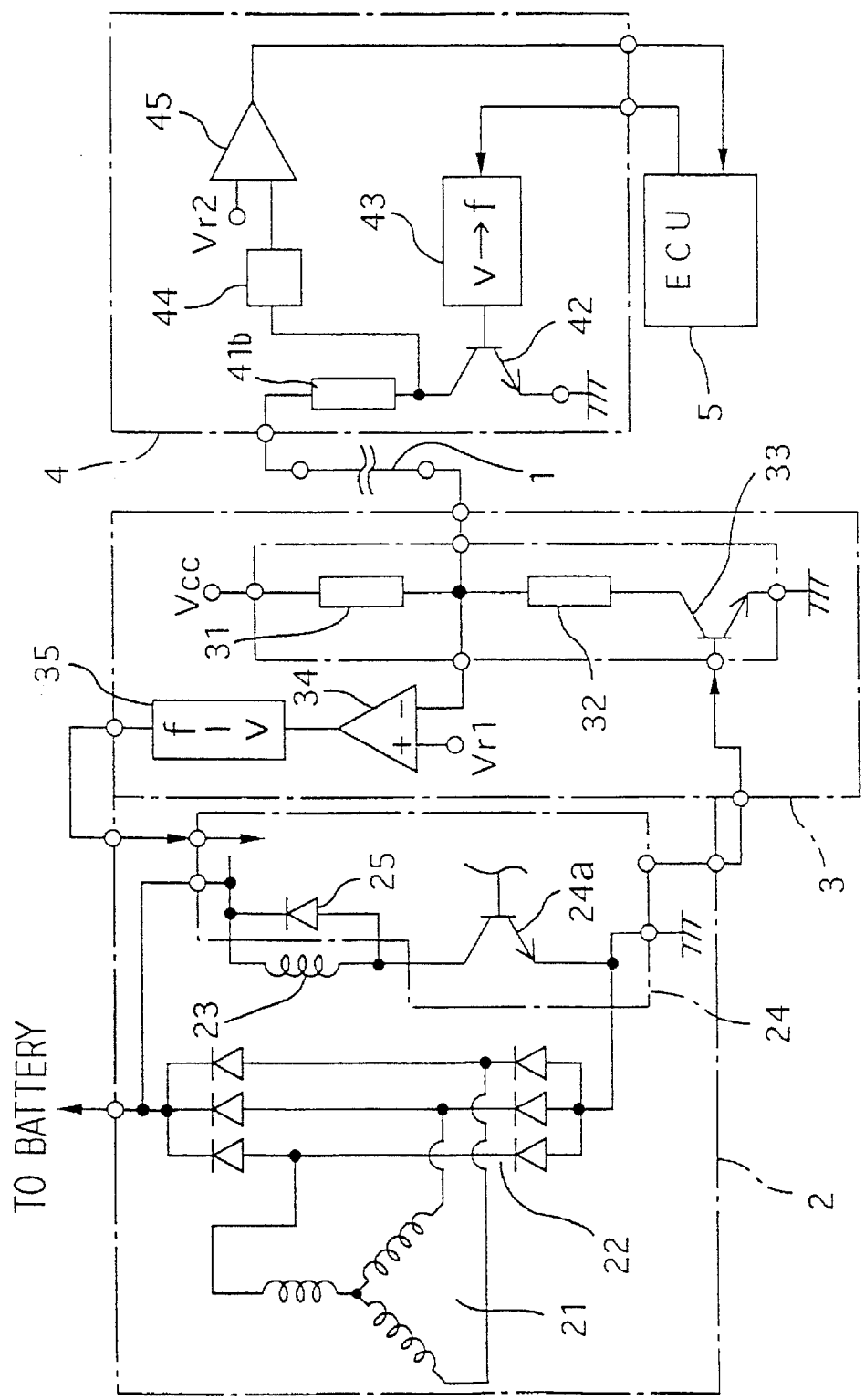
FIG. 1 is a circuit diagram of a battery charging device according to a first embodiment of the present invention.

A battery charging device for a vehicle according to a first embodiment is described with reference to FIG. 1.

This embodiment carries two-way-real-time communication, using frequency-modulated (FM) signals as the generation control signal and DC voltage signal (which includes low frequency AC signal) as the generator condition signal.

A reference numeral 1 represents a transmitting wire, 2 a generator for a vehicle, 3 a generator-side transmitting and receiving circuit, 4 a vehicle-side transmitting and receiving circuit and a reference numeral 5 represents an ECU (Electronic Control Unit) having a microcomputer therein.

The generator 2 is a three-phase synchronous AC generator driven by an engine and has an armature coil 21, rectifying unit 22 for rectifying the three phase output voltage to be supplied to a battery (not shown), a field exciting coil 23, a voltage regulator which controls the exciting current supplied to the exciting coil 23 and a flywheel diode 25. The generator 2 is well known and further description thereof is omitted.

The generator-side transmitting and receiving circuit 3 (hereinafter referred to as the generator T-R circuit) is composed of a condition signal sender section and a control signal receiver section. The condition signal sender section is composed of a series circuit of a resistor 31 connected between the transmitting wire 1 and a voltage source Vcc, a resistor 32 and a transistor 33 which is connected to a grounded terminal through the emitter thereof. The control signal receiver section is composed of a comparator 34 and a f-V converter 35. An end of the transmitting wire 1 is connected to an input terminal of the comparator 34 which compares the voltage of the transmitting wire with a reference voltage Vr1 and provides an output signal, which is converted by the f-V converter 35 and sent to the regulator 24. The resistor 31 functions as a load of an open-collector-type emitter-grounded transistor 42 which is described later.

The vehicle-side T-R circuit 4 is composed of a control signal sender section and a condition signal receiver section. The control signal sender section is composed of a resistor 41b, the transistor 42 and a V-f inverter 43. The resistor 41b and the emitter grounded transistor 42 are connected in series to connect the transmitting wire 1 with a grounded terminal. The condition signal receiver is composed of a peak hold circuit 44 and a comparator 45.

The operation of the above circuit is described hereafter.

The regulator 24 compares a divided voltage of the battery voltage Vb with a certain threshold voltage Vref in the well known manner, and turns on or off a switching transistor 24a to carry the pulse width modulation control of the exciting current (hereinafter referred to as PWM-control), thereby maintaining the battery voltage at a designated voltage. For instance, if a divided voltage of the battery voltage Vb is higher than a threshold voltage Vref, the switching transistor 24a is turned off, and if it is lower than the threshold voltage Vref on the other hand, the transistor 24a is turned on.

The generation control of the ECU 5 is described next.

The ECU 5 sends a generation command signal Vgc to the V-f converter 43. The generation command signal Vgc has a first voltage level to turn on the transistor 24a and a second voltage level to turn off the transistor 24a. The V-f converter 43 converters the first voltage level into a binary pulse voltage having a first cycle and the second voltage level into a binary pulse voltage having a second cycle, thereby to switch on and off the transistor 42 according to these cycles. Accordingly, while the transistor 33 is in the off state, a pulse signal voltage which changes between a high level voltage VH and a low level voltage VL with the constant cycle is applied to an input terminal of the comparator 34. When the transistor 33 is in the on state, the above high level voltage VH and low level voltage VL decrease to VH' and VL' respectively due to the voltage drop.

If the threshold level voltage Vr1 of the comparator 34 is lower than the high level voltages VH and VH' and higher than the low level voltages VL and VL', the switching operation of the transistor 42 or transmission of the generation control signal is detected to be normal.

The collector voltage of the transistor 42 becomes the ground level when the transistor 42 is turned on. The collector voltage of the transistor 42 becomes the high level voltage VH when the transistors 42 and 33 are turned off, and becomes the high level voltage VH' when the transistor 42 is in the on state and the transistor 33 is in the off state. Accordingly, if the collector voltage of the transistor 42 is held by the peak hold circuit 44 during a fixed period before applied to an input terminal of the comparator 45 and the threshold voltage Vr2 is set between VH and VH', the output voltage of the comparator 45 changes with on state and off state of the transistor 33, when the generator condition signal is correctly transmitted and received.

The generator condition signal can indicate whether the generator generates power or not and also can transmit or receive an analog value of the battery voltage. For instance, if the transistor 33 is PWM-controlled according to the on-duty ratio which is proportional to an analog value of the battery voltage, the output signal of the comparator 45 becomes a PWM signal of the analog value of the battery.

Figure 7:
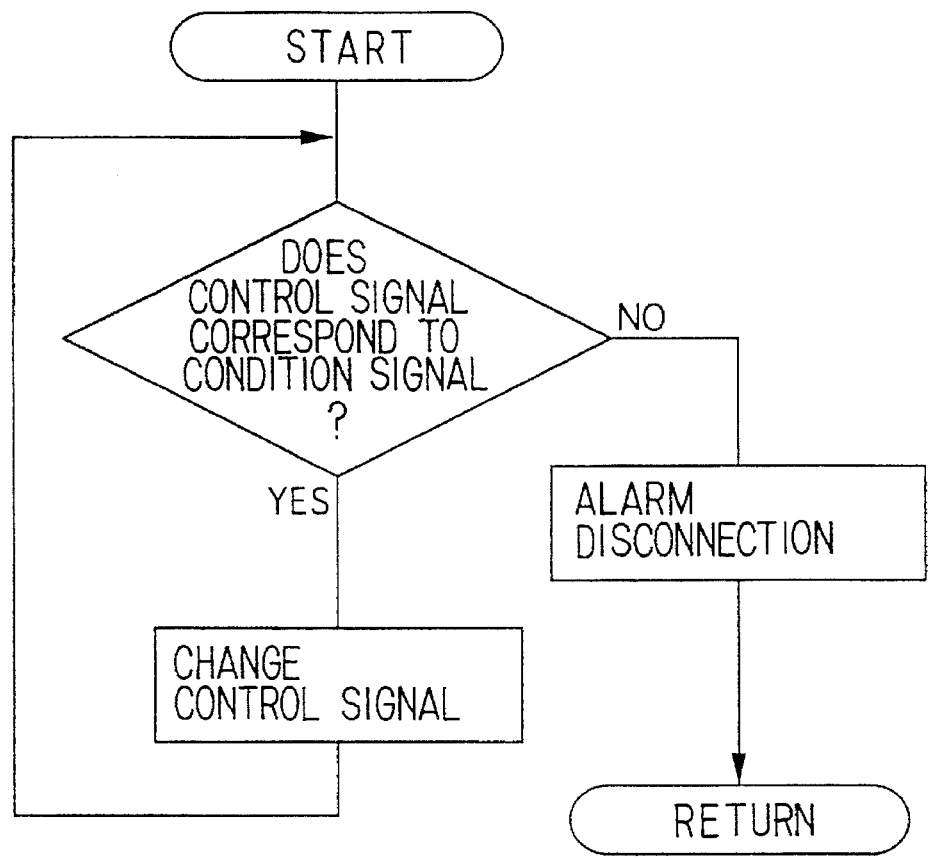
FIG. 7 is an example of a flow chart of detecting operation when disconnection of a transmitting wire takes place.

If the transmitting wire 1 is disconnected, the situation becomes the same as when the transistor 42 is in the off state. Therefore, if the regulator is controlled to hold the generator output voltage at the battery voltage when the output voltage of the f-V converter 35 is applied to the regulator 24, an abnormal situation such as entire generation stop or uncontrolled generation can be prevented. The disconnection of transmitting wire 1 is detected easily, since the output voltage of the comparator 45 does not change although the ECU 5 sends switching command signal to the transistor 42. FIG. 7 shows a flow chart of operation of the ECU 5 when the disconnection of the transmitting wire 1 is detected.

According to the first embodiment, since the disconnection of the transmitting wire 1 is detected easily and the transmitting wire 1 is composed of a single cable wire, the cross talk between the otherwise separated generation control signal transmitting wire and generator condition signal transmitting wire is reduced, thereby allowing increase of the output impedance of the driver element. As a result, more compact driver element can be used in the battery charging device, which results in less power consumption and simpler structure of the device which can operates normally even if the transmitting wire is disconnected.

Second Embodiment

A second embodiment is described with reference to FIG. 2. Incidentally, the same reference numerals indicate the same or substantially the same parts, components or sections and detailed descriptions are omitted hereinafter. The generator T-R circuit 3 of the first embodiment is omitted and the vehicle T-R circuit of the first embodiment is changed in this embodiment.

The regulator 24 of this embodiment has a front stage power amplifying circuit 24b which functions as a generator T-R circuit.

The front stage power amplifying circuit 24b is a inverter circuit composed of a transistor 26 having a grounded emitter and a load resistor r1 thereof. The transmitting wire 1 is connected to a portion between the transistor 26 and the resistor r1 which functions as a load resistor of a transistor 42 having a grounded emitter. An amplifier 46, which is an input stage of a condition signal receiver section, is connected to the transmitting wire 1.

The regulator operates in the well known manner. That is, when a voltage which is given by dividing a battery voltage (B voltage) by resistors r2 and r3 is becomes higher than a fixed level, a Zener diode 27 is turned on to turn on the transistor 26, thereby turning off the transistor 24a to stop generation of the generator 2. On the other hand, when the above divided voltage is lower than the fixed value, the Zener diode 27 is turned off to turn off the transistor 26, thereby turning on the transistor 24a to start the generation. Thus the battery voltage is regulated within a fixed range.

The signal transmitting and receiving operation is described next.

Since one end of the transmitting wire 1 is connected to the output terminal of the front stage circuit 24b, when the transistor 42 is in the off state, output voltage Lo or Hi of the front stage circuit 24b becomes the generator condition signal which indicates whether the generator is generating output voltage or not. The voltage Lo or Hi is received by the amplifier 46.

When the transistor 42, which is an element of the control signal sender section, is turned on, the voltage of the transmitting wire 1 becomes low to turn off the transistor 24a, thereby cutting the exciting current to stop the generation. The generation stop is detected by the comparator 46 immediately.

As described above, the condition signal sender section and the control signal receiver section as described in the first embodiment can be substantially omitted and the control signal sender and the condition signal receiver can be made simple, and further the modulation or demodulation is not necessary. Accordingly, the device having very simple circuit is provided.

If the transmitting wire is disconnected, the same operation as the first embodiment is carried out, and the disconnection is detected in the same manner as the first embodiment.

Third Embodiment

A battery charging device for a vehicle according to a third embodiment is described with reference to FIG. 3.

Comparison result of the generator output voltage and the regulated voltage is transmitted as the generator condition signal in the third embodiment.

Figure 2:
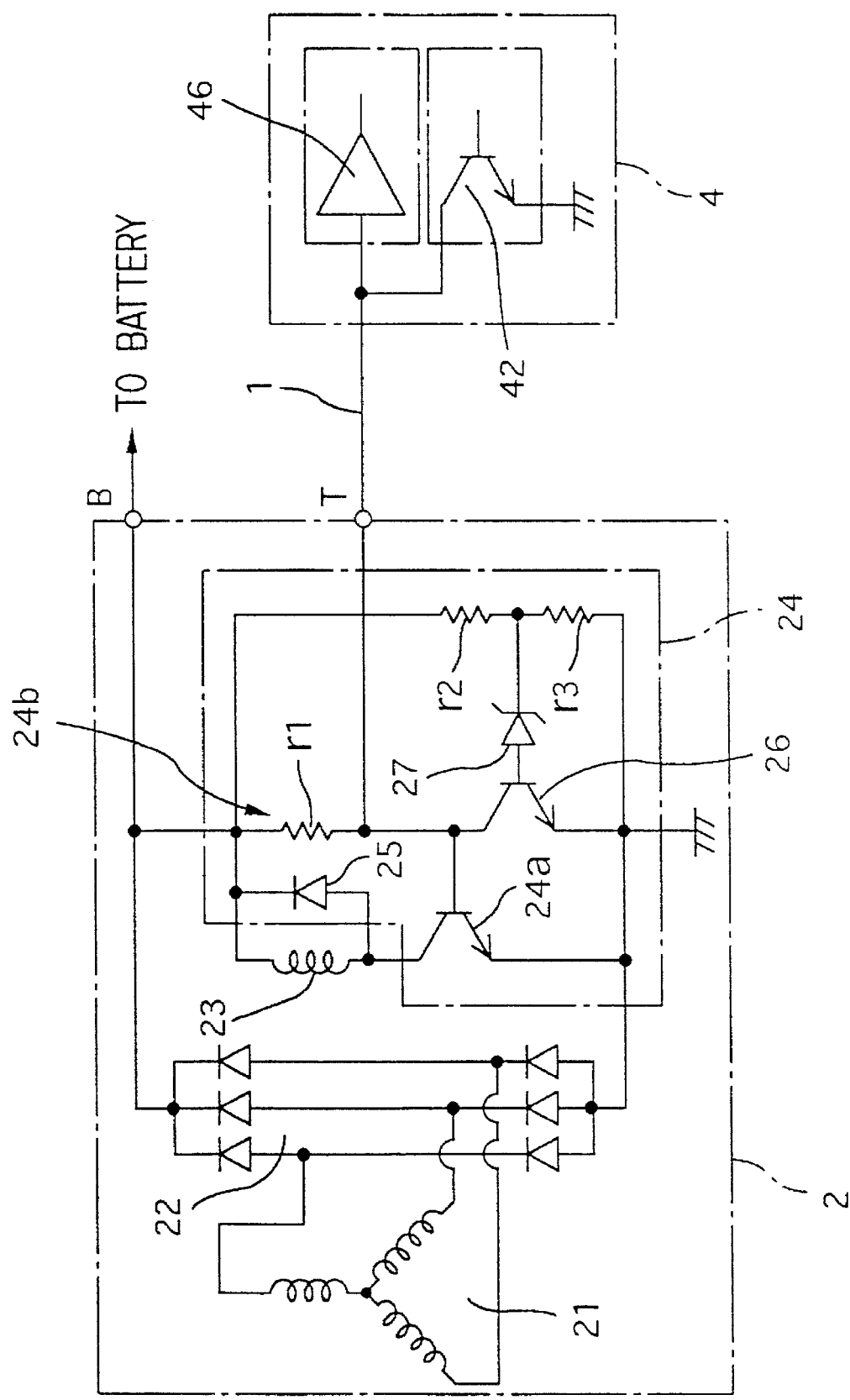
FIG. 2 is a circuit diagram of a battery charging device according to a second embodiment of the present invention.

The Zener diode 27 of the second embodiment shown in FIG. 2 is replaced with a comparator 280 in this embodiment. The output voltage of the comparator 280 is applied to the base of a transistor 26 through a NAND circuit 283 and a base current limiting resistor rb. The output voltage of the comparator 280 is sent to the transmitting wire through a NOT circuit 281 and a resistor r4. The output voltage of the transmitting wire 1 is sent to a NAND circuit 283 through a NOT circuit 282. Thus, the NOT circuit 281 and the resistor r4 composes the condition signal sender section and the NOT circuit 282 composes the control signal receiver section.

In addition, the transistor 42 having the grounded emitter in the second embodiment is replaced with an emitter follower transistor 42a having an open emitter connected to the transmitting wire 1. That is, the transistor 42a composes the control signal sender section and the NOT circuit 281 and the resistor r4 compose the load of the transistor 42a.

The operation is described next.

A regulator 24 operates in the same manner as that of the previous embodiments. A divided voltage Vb of the battery voltage is given by a battery voltage dividing circuit which is composed of a series circuit r2 and r3, and is compared with a reference voltage Vref by the comparator 280, which sends binary signal voltage corresponding to the comparison result to the NAND circuit 283.

If the divided voltage Vb is higher than the reference voltage Vref, the output voltage of the NOT circuit 281 becomes Hi and the output voltage of the NOT circuit 282 becomes Lo whether the transistor 42a is in the on state or not. Accordingly, the output terminal of the NAND circuit 283 becomes Hi to turn on the transistor 26 so that the transistor 24a interrupts the exciting current. That is, when the battery voltage is high enough (when the battery has sufficient capacity to drive various loads or when it has no other capacity to accumulate the electric power), the regulator 24 stops the generation irrespective of the generator control signal.

On the other hand, when the divided voltage is lower than the reference voltage Vref, the output voltage of the comparator 280 becomes Hi, the output voltage of the NOT circuit 281 becomes Lo so that the normal generation is carried out, even when the transmitting wire 1 is disconnected. If the generator control signal is not applied from the outside or if the transistor 42a is in the off state, the output voltage of the NOT circuit 282 becomes Hi and both input terminals of the NAND circuits 283 become Hi to send the transistor 26 the signal Lo. Accordingly, the transistor 26 is turned off to turn on the transistor 24a, thereby supplying the exciting current. In other words, when the battery voltage is low and the transistor 42a is in the off state, the generation is not carried out.

When the transistor 42a is turned on while the output voltage of the NOT circuit 281 is Lo, the signal Hi is applied to the NOT circuit 282, and the NAND circuit 283 gives the transistor 26 the signal Hi to turn on, so that the transistor 24a is made nonconductive to cut the exciting current. That is, when the transistor 42a is turned on, the generation is stopped irrespective of the battery voltage.

The above generation control mode is summarized as follows.

When the generation stop command is applied from the outside to the regulator 24 (while the transistor is in the on state), the generation can be stopped irrespective of the battery voltage. This function is effective when a vehicle runs uphill, for instance.

As described above, this embodiment stops the generation from the outside with a simple circuit.

Receiving operation of the generator condition signal by the amplifier 46 is described next.

As described above, when the input voltage Vout of the NOT circuit 282 is Lo, it indicates that the generator is generating power, and when the voltage Vout is Hi, it indicates that the generator stops generation. The amplifier 46, therefore, receive such information.

If the transmitting wire 1 is disconnected, this embodiment operates in the same manner as the first embodiment and detects the disconnection.

Fourth Embodiment

Figure 4:
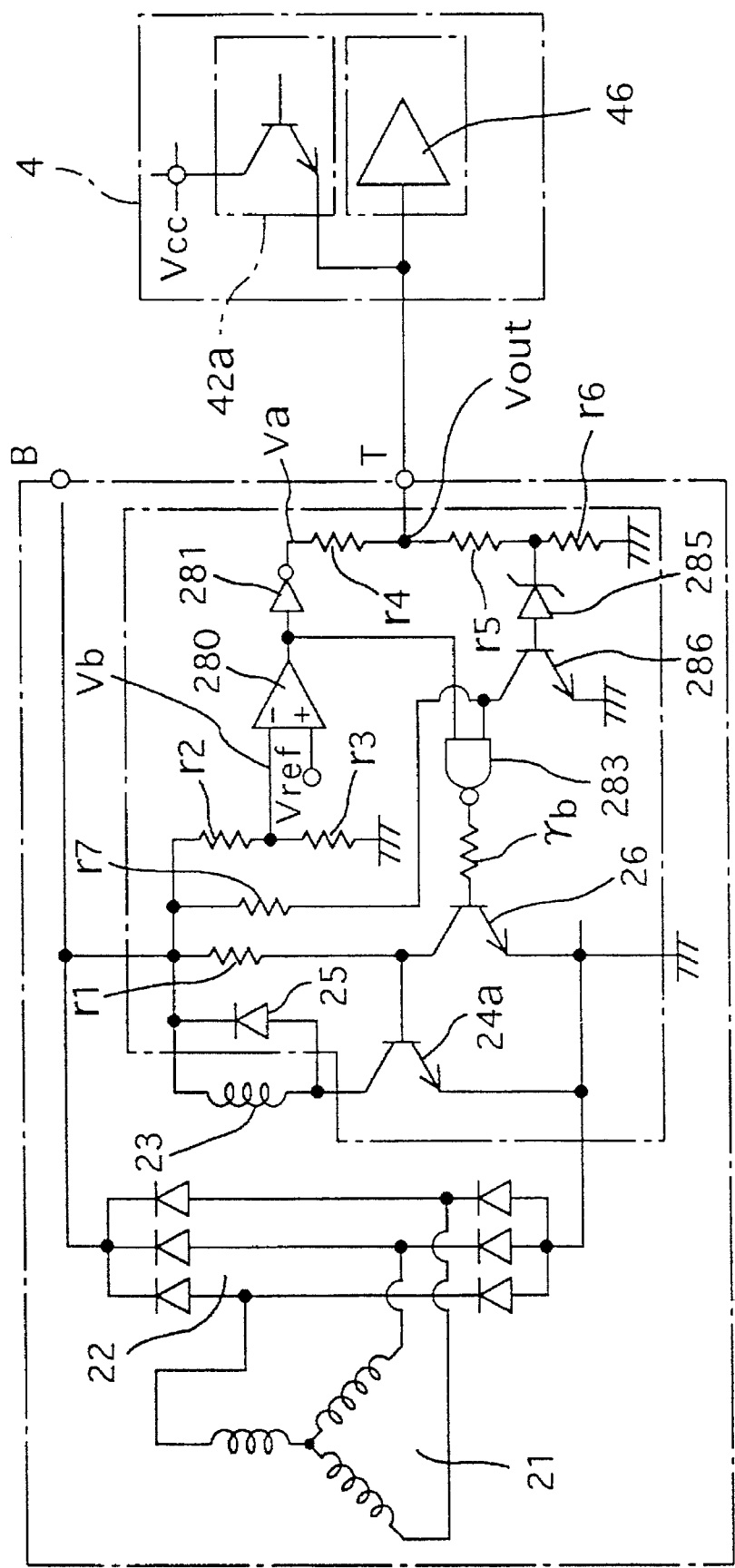
FIG. 4 is a circuit diagram of a battery charging device according to a fourth embodiment of the present invention.

A battery charging device according to a fourth embodiment is described with reference to FIG. 4 next.

Figure 3:
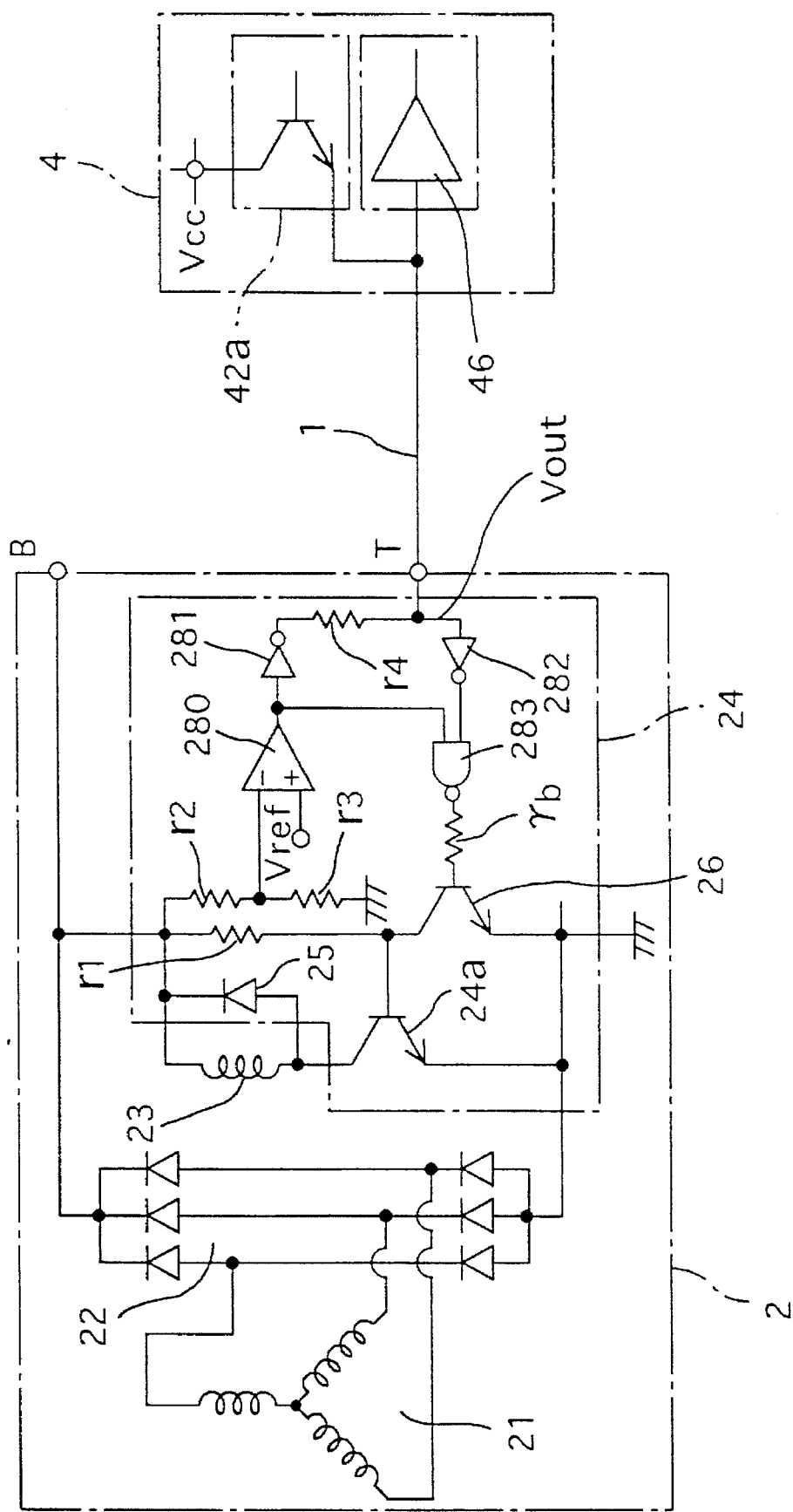
FIG. 3 is a circuit diagram of a battery charging device according to a third embodiment of the present invention.

The NOT circuit 282 of the third embodiment shown in FIG. 3 is replaced with voltage dividing resistors r5 and r6, a Zener diode 285, a transistor 286 having the grounded emitter and a resistor r7.

Voltage on the generator side terminal T of the transmitting wire 1 is divided by the voltage dividing circuit which includes the resistors r5 and r6, and is applied to the base of the transistor 286 through the Zener diode 285. The resistor r7 is the load of the transistor 286 and composes an inverter circuit or NOT circuit with the transistor 286, whose output voltage is applied to the transistor 26 through the NAND circuit 283 and the resistor rb (as in the third embodiment).

The operation of the specific feature different from those of the third embodiment is described next.

The collector voltage Vcc of the transistor 42a is set higher than the output voltage Vout of the terminal T in this embodiment.

When the battery voltage Vb is higher than the reference voltage Vref, and the NOT circuit 281 provides the signal Hi and also the transistor 42a is in the off state, the voltage dividing resistors r5 and r6 divide the signal Hi of the NOT circuit 281, which is applied to the Zener diode 285. At this moment if the Zener voltage is higher than the signal Hi of the NOT circuit 281, the transistor 286 provides the signal Hi. However, since the output voltage of the comparator 280 is Lo, the NAND circuit 283 provides the signal Hi so that the transistor 26 turns on and the transistor 24a turns off to stop the generation.

When the battery voltage is lower than the reference voltage Vref and the NOT circuit 281 provides the signal Lo and also the transistor 42a is in the off state, the transistor 286 provides the signal Hi to make the NAND circuit 283 to provide the signal Lo with the comparator 280 providing the signal Hi, so that the transistor 26 turns off and the transistor 24a turns on to start the generation.

When the transistor 42a is in the off state, the transistor 26 is controlled so that the divided voltage of the battery voltage becomes equal to the reference voltage Vref.

When the transistor 42a is in the on state, the output voltage Vout of the terminal T becomes as follows: Vout= Vcc−0.75 V. The voltage is divided and applied to the Zener diode 285. If Vcc −1.5 V is higher than the Zener voltage of the Zener diode 285, the transistor 286 is turned on to make the NAND circuit 283 provide the signal Hi irrespective of the output voltage of the comparator 280, so that the transistor 26 turns on and the transistor 24a turns off to stop the generation.

It is noted in this embodiment that there are a first mode to stop the generation compulsorily when the transistor 42a is in the on state, a second mode to carry the generation when the transistor 42a is in the off state and the divided-battery-voltage is lower than the reference voltage and a third mode to stop the generation when the transistor 42a is in the off state and the divided-battery-voltage is higher than the reference voltage.

In this embodiment, the input voltage of the amplifier 46 becomes equal to Vcc −0.75 in case of the first mode, becomes Lo (ground voltage) in case of the second mode and becomes a divided voltage of the voltage dividing resistors r4, r5 and r6. As a result, the normal generation, the compulsory stop of the generation and the normal generation stop can be recognized by a simple circuit.

Fifth Embodiment

A battery charging device according to a fifth embodiment is described with reference to FIG. 5.

The NAND circuit 283 of the third embodiment is replaced with a second comparator 291, a NOT circuit 292, AND circuits 293 and 294 and a NOR circuit 295 in this embodiment.

Voltage Vout of a generator side terminal T of the transmitting wire 1 is applied to the NAND circuit 294 through the NOT circuit 282, and to the AND circuit 293 through the NOT circuit 292. The second comparator 291 compares the divided-battery-voltage with a reference voltage Vref2, and gives the comparison result to the AND circuit 293. The comparator 280 gives the comparison result to the AND circuit 294. The second reference voltage Vref2 is set lower than the reference voltage Vref.

The operation of specific features of the fifth embodiment which are different from the third embodiment is described below.

When the transistor 42a (shown in FIG. 3) is in the on state, the voltage Vout of the transmitting wire 1 is kept constant by the electric source voltage Vcc of the transistor 42a, and the NOT circuit 282 provides the signal Lo and, consequently, the AND circuit 294 always provides the signal Lo, so that the AND circuit 293 provides a signal following the output voltage of the comparator 291. That is, when the divided-battery-voltage Vb is lower than the reference voltage Vref2, the AND circuit 293 provides the signal Hi, the NOR circuit 295 provides the signal Lo, the transistor 26 is turned off, and the transistor 24a is turned on to start the generation.

The operation of the device when the transistor 42a (see FIG. 3) in the off state is described next.

When the divided-battery-voltage Vb is higher than the reference voltage Vref, the output voltages of the comparators 280 and 291 become Lo, the output voltages of the AND circuits 293 and 294 become Lo, the output voltage of the NOR circuit 295 becomes Hi, the transistor 26 is turned on, and the transistor 24a is turned off to stop the generation. On the other hand, when the divided-battery-voltage Vb is lower than the reference voltage Vref, the output voltage of the comparator 280 becomes Hi, the generator terminal voltage Vout becomes Lo, the AND circuit 293 provides the signal Lo, the AND circuit 294 provides the signal Hi, the transistor 26 is turned off and the transistor 24a is turned on to start the generation. That is, when the divided-battery voltage Vb is higher than the reference voltage Vref, the generation is stopped, and when lower, the generation is carried out. As a result, when the transistor 42a is turned off, the regulator 24 controls the exciting current so that the divided-battery-voltage become equal to the reference voltage Vref.

The voltage of the transmitting wire 1 which is the receiving voltage of the amplifier 46 is described below.

The terminal T (where the voltage Vout of the transmitting wire 1 appears) receives the signal Hi while the transistor 42a is in the on state, in other words, while the command signal is being given to maintain the second reference voltage Vref2 or while the generator is currently generating electric power at the reference voltage Vref. On the other hand, the terminal receives the signal Lo while the generator currently stops the generation to maintain the reference voltage Vref.

The above conditions can be detected by those signals.

Sixth Embodiment

Figure 6:
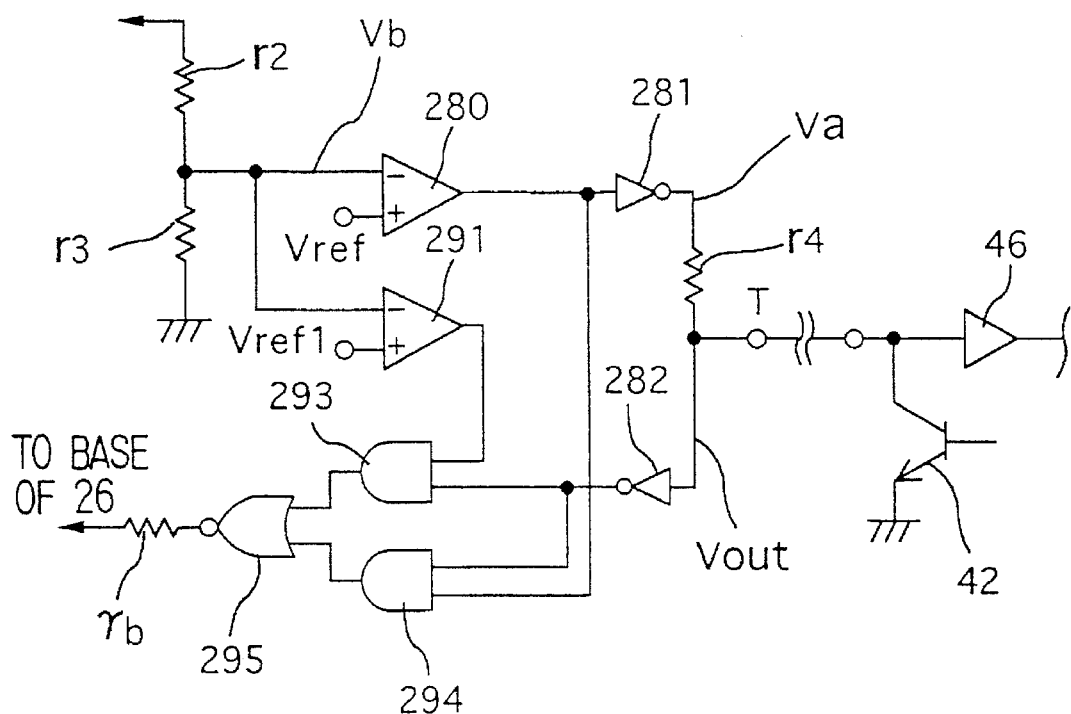
FIG. 6 is a circuit diagram of a battery charging device according to a sixth embodiment of the present invention.

A battery charging device according to a sixth embodiment is described with reference to FIG. 6.

Figure 5:
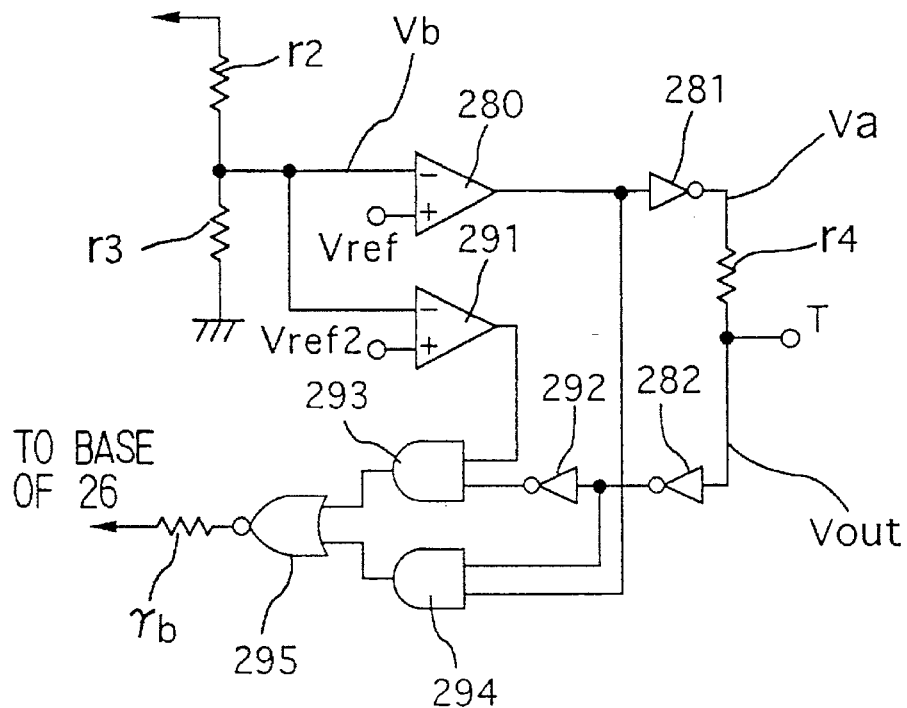
FIG. 5 is a circuit diagram of a battery charging device according to a fifth embodiment of the present invention.

The NOT circuit 292 of the fifth embodiment shown in FIG. 5 is omitted from this embodiment. A first reference voltage Vref1 which is higher than the reference voltage Vref is applied to the plus terminal of the second comparator, and the output circuit of the generator control signal transmitting means section has the same transistor 42 as the second embodiment.

Only the operation of the specific features different from the fifth embodiment is described herein.

At the beginning, when the transistor 42 is in the on state, the voltage Vout of the transmitting wire is Lo and the output voltage of the NOT circuit 282 is held Hi, so that the NOR circuit 295 provides the signal Hi only when the divided-battery-voltage Vb is higher than the first reference voltage Vref1. Accordingly, the transistor 26 is in the on state and the transistor 24a is in the off state to stop the generation. On the other hand, when the divided-battery-voltage Vb is lower than the first reference voltage Vref1, the AND circuit 293 provides the signal Hi, the NOR circuit 295 provides the signal Lo so that the transistor 26 turns off and the transistor 24a turns on to carry out the generation.

When the transistor 42 is in the off state, if the divided battery voltage Vb is higher than the reference voltage Vref, the AND circuits 293 and 294 receive the signal Lo respectively and the NOR circuit 295 provides the signal Hi so that the transistor 26 is in the on state and the transistor 24a is in the off state to stop the generation. When the divided-battery-voltage Vb is lower than the reference voltage Vref, the AND circuits 293 and 294 receive the signal Lo respectively, the NOR circuit 295 provides the signal Lo so that the transistor 26 turns off and the transistor 24a turns on to carry out the generation.

In summary, when the transistor 42 is in the on state, the generator is controlled so that the divided-battery-voltage becomes equal to the first reference voltage Vref1; and when the transistor 42 is in the off state, the generator is controlled so that the divided-battery-voltage becomes equal to the reference voltage Vref.

Thus, the battery voltage can be controlled differently according to the generator condition, and power corresponding to the difference between both voltages can be used without shortage of the battery charging capacity.

The voltage to be applied to the amplifier 46 is described next.

The voltage of the transmitting wire 1 is Lo during the mode to maintain the divided-battery-voltage at the first reference voltage Vref1. The voltage of the transmitting wire 1 is also Lo during the mode to maintain the divided-battery-voltage at the above reference voltage Vref if the divided-battery-voltage Vb is lower than the reference voltage Vref. The voltage of the transmitting wire 1 is Hi during the mode to maintain the divided-battery-voltage if the divided-battery-voltage Vb is higher than the reference voltage Vref. Thus, the generator condition can be detected.

Seventh Embodiment

Figure 8:
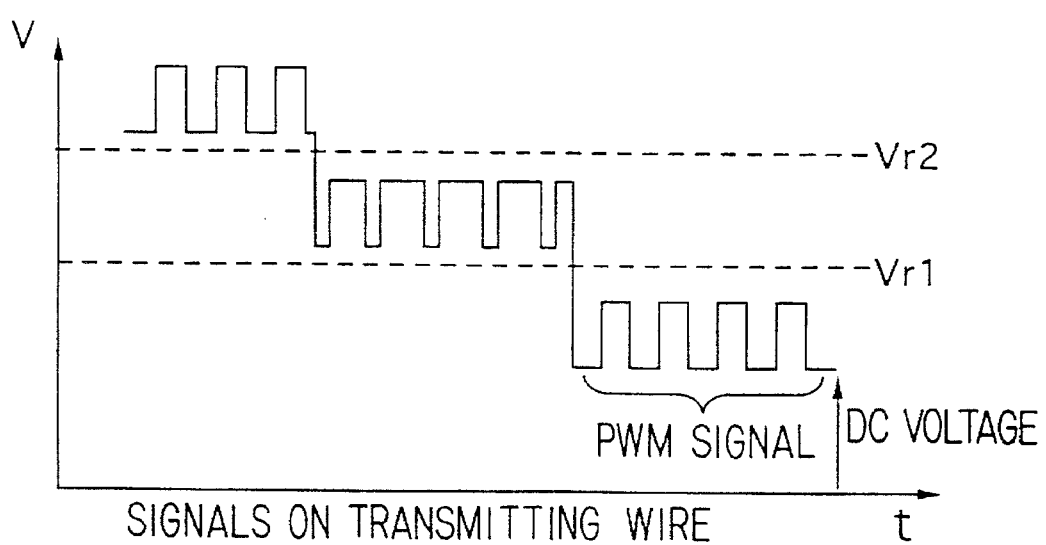
FIG. 8 is a chart showing an example of transmitting and receiving operation through a transmitting wire of the battery charging device according to the present invention.
Figure 9:
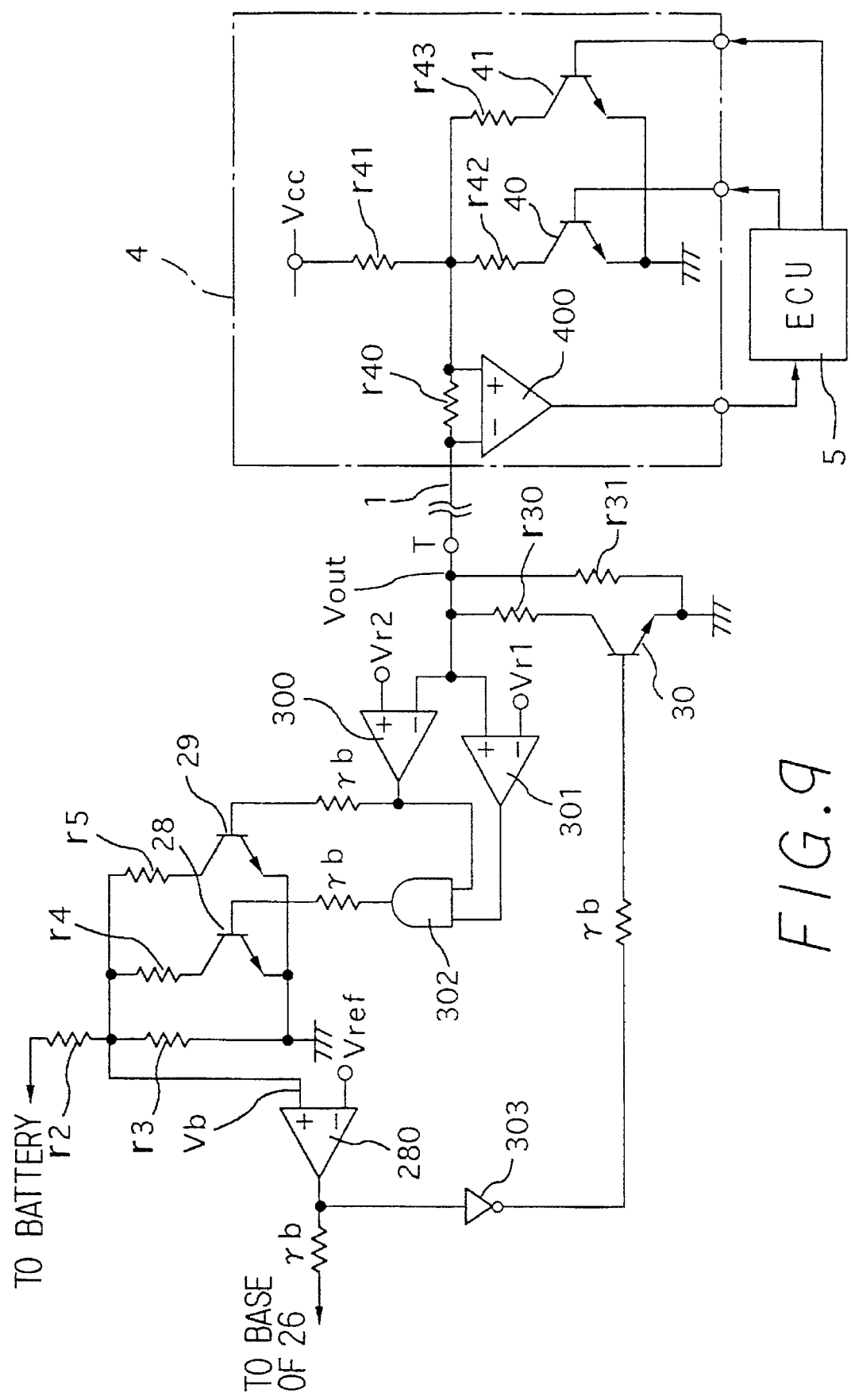
FIG. 9 is a circuit diagram of the seventh embodiment which uses the signals shown in FIG. 8.

A battery charging device according to a seventh embodiment is described with reference to FIG. 8 and FIG. 9. The Zener diode 27 of the second embodiment is replaced with a comparator 280 in this embodiment, and the generator output voltage of the battery charging device according to this embodiment is changed by changing the dividing ratio of the voltage dividing resistors.

Two way communication between the generator side and the ECU side is carried out through the transmitting wire 1 in this embodiment. FIG. 8 shows an example of a signal composed of a DC voltage signal component and a PCM signal component as a combined signal of the generator condition signal and the generator control signal. The generator control signal is transmitted at a DC voltage level, and the generator condition signal is transmitted as an output signal of a comparator 280 which compares the divided-battery-voltage with the reference voltage Vref. Therefore, the signal transmitted by the transmitting wire 1 is composed of the DC voltage component and the PWM signal component.

A vehicle side T-R circuit 4 includes a condition signal receiver section which is composed of a resistor r40 and a comparator 400 and a control signal sender section which is composed of resistors r41, r42 and r43 and transistors 40 and 41. The operation of the generator control signal transmitting circuit is described hereafter. An end of the resistor r41 is connected to the voltage source Vcc and the other end thereof is connected to each one end of the resistor 40 which detects the generator condition signal and the resistors r41 and r42. The other end of each of the resistors r42 and r43 is connected respectively to each collector of the transistors 40 and 41 having the respective grounded emitters. The transistors 40 and 41 turn on and off according to the signals of the ECU 5.

The generator-side control signal receiver section is composed of comparators 300 and 301 and a resistor r31. The minus input terminal of the comparator 300, the plus input terminal of the comparator 301 and an end of the resistor 31 are connected to the generator-side terminal T of the transmitting wire 1. A reference voltage Vr2 is applied to the plus input terminal of the comparator 300, and a reference voltage Vr1 is applied to the minus input terminal of the comparator 301. The reference voltage Vr2 is set higher than the reference voltage Vr1. When both transistors 40 and 41 of the generator control signal transmitting circuit receives an off signal from the ECU 5, the voltage Vout of the generator-side terminal T becomes Vout2 which is given after dividing the Vcc by the resistor 31 and the series connected resistors r40 and r41. The voltage Vout1 is higher than the reference voltage Vr2. When the transistor 40 is turned on and the transistor 41 is turned off according to the command signal of the ECU 5, the voltage Vout of the generator-side terminal T becomes Vout2 due to the voltage drop by the resistor r41, which is lower than the reference voltage Vr2 and higher than the reference voltage Vr1. When both transistors 40 and 41 are turned on by command of the ECU 5, the voltage Vout on the generator-side input terminal T becomes Vout3 which is lower than the reference voltage Vr1.

An output voltage of the comparator 300 of the control signal receiver section is applied to a transistor 29 through a base resistor rb and an AND circuit 302. An output voltage of a comparator 301 is applied to the AND circuit 302 whose output voltage is applied to the base of a transistor 28 through a base resistor rb. The collectors of the transistors 28 and 29 are connected through resistors r4 and r5 respectively to a junction of the resistors r2 and r3 in order to change the voltage dividing ratio thereof in response to the on-off operation of the transistors 28 and 29. Thus, the generator output voltage can be controlled to a normal voltage Vreg, a high voltage VHi or a low voltage VLo.

In more detail, when the voltage Vout1 which is higher than the reference voltage Vr2 is applied on the terminal T, the output voltage of the comparator 300 becomes Lo and both transistors 28 and 29 are turned off to increase the voltage dividing ratio so that the generator output voltage becomes VLo. When the voltage Vout3 which is lower than the reference voltage Vr1 is applied on the terminal T, the output voltage of the comparator 300 becomes Hi, the output voltage of the comparator 301 becomes Lo and the transistor 29 turns on to reduce the voltage dividing ratio so that the generator output voltage becomes the regular voltage Vreg. On the other hand, when the voltage Vout2 which is lower than the reference voltage Vr2 and higher than the reference voltage Vref1 is applied to the terminal T, both output voltages of the comparator 300 and 301 become Hi and both transistors 29 and 28 turn on to reduce the voltage dividing ratio so that generator output voltage becomes higher than the normal output voltage.

The condition signal sender section is composed of a transistor 30 and a resistor r30 which is connected between the collector of the transistor 30 and the terminal T. The output voltage of the comparator 280 is applied to the base of the transistor 30 through a NOT circuit 303. Accordingly, when the output voltage of the comparator 280 is Lo, the transistor 30 is turned on, and when Hi, it is turned off. Since the resistor r30 is set smaller than a resistor r31 and larger than any one of resistors r42 and r43, the voltage Vout1 of the terminal T becomes higher than the reference voltage Vr2, and the output voltage Vout2 becomes higher than the reference voltage Vr1 if the transistor 30 is turned on. And, therefore, difference voltage appears across the resistor r40 for detecting the generator condition signal so that the comparator 400 can detect the transistor 30 being in the on state. As a result, when the transistor 30 is turned on and off to transmit the generator condition signal, difference voltage corresponding to the signal is generated across the sensing resistor r40. The difference voltage is compared by the comparator 400, whose output voltage is applied to the ECU 5.

In summary, the generator output voltage can be maintained at a normal voltage, lowered to increase the vehicle acceleration performance or increased to carry out the regeneration when the vehicle is being decelerated by the ECU 5 which turns on or off the transistors 40 and 41 of the generator control signal transmitting circuit. Since the PWM signal (which is the generator condition signal) can be separated from the DC voltage signal, the ECU can monitor the generator condition all the time even if the DC voltage signal changes (or the generator condition is changed). If the transmitting wire 1 is disconnected, the voltage of the terminal T is maintained lower than the reference voltage Vr1 by the resistor r31 to carry out the normal generation condition (self control generation) so that excessive battery charging or battery draining can be prevented. When the transmitting wire 1 is disconnected, the voltage across the sensing resistor r40 disappears and is detected by the ECU 5 with ease.

Eighth Embodiment

Figure 10:
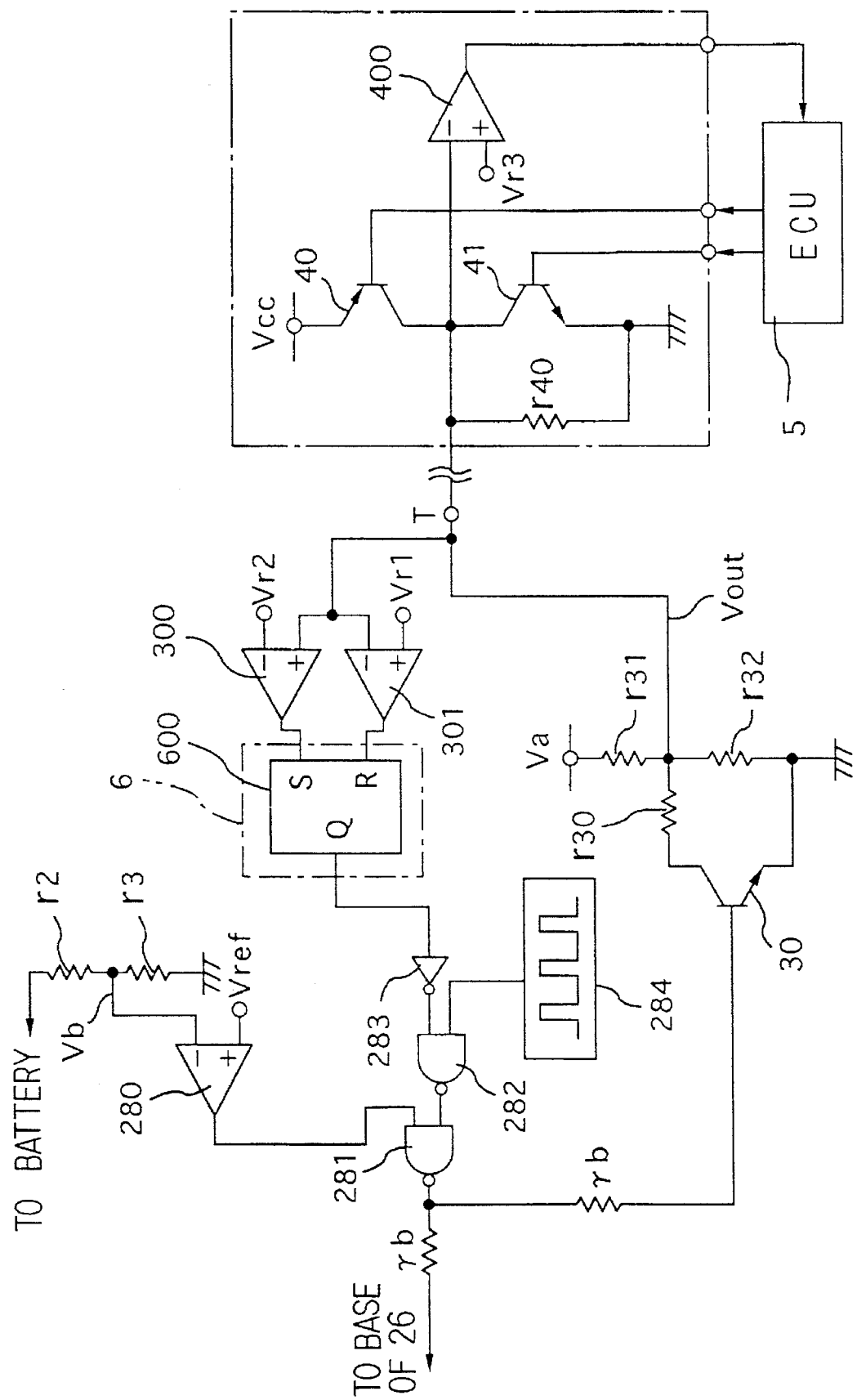
FIG. 10 is a battery charging device according to a eighth embodiment of the present invention.

A battery charging device according to an eighth embodiment is described with reference to FIG. 10. The Zener diode 27 of the second embodiment is replaced with a comparator 280, NAND circuits 281 and 282, a NOT circuit 283 and an oscillator 284. A maximum value of the duty ratio of the exciting current switching transistor can be controlled by a control signal given by the vehicle-side ECU. In other words, a generator control signal holding circuit 6 is disposed between the generator voltage regulator and the signal receiver section.

The control signal receiver section is composed of comparators 300 and 301. Reference voltage Vr2 is applied to the minus terminal of the comparator 300 and reference voltage Vr1 is applied to the plus terminal of the comparator 301. The reference voltage Vr2 is set higher than the reference voltage Vr1. The plus terminal of the comparator 300 and the minus terminal of the comparator 301 are jointly connected to the terminal T. A generator condition output circuit is composed of a transistor 30 having the base to which an output voltage of the comparator 280 of the regulator is applied through the NAND circuit 281, a resistor r30 connected between the collector of the transistor 30 and the terminal T, a resistor 31 connected between a voltage source Va and the terminal T and a resistor 32 connected between the terminal T and a ground terminal. The source voltage Va is divided by a dividing circuit composed of the resistors r31 and r32 and a resistor r40 (which is connected between the vehicle-side transmitting wire and a ground terminal) into the voltage Vout of the terminal T. When the transistor 30 is turned on, the voltage Vout on the terminal T is lowered by the resistor r30 to Vout'.

The generator condition signal receiving circuit is composed of a comparator 400 whose minus terminal is connected to the terminal T of the transmitting wire and whose plus terminal is applied with a reference voltage Vr3. The relationship between the output voltage Vout of the terminal T and the respective reference voltages is as follows;

$$Vr2 > Vout > Vr3 > Vout' > Vr1.$$

The generator control signal transmitting circuit is composed of a transistor 40 whose emitter is connected to the voltage source terminal Vcc and whose collector is connected to the output terminal T of the transmitting wire and a transistor 41 whose emitter is grounded. When the transistor 40 is commanded to turn on by the ECU 5, the voltage Vout of the transmitting wire becomes the source voltage Vcc and the output signal of the comparator 301 becomes Lo since the source voltage Vcc is set higher than the reference voltage Vr2.

At the same time, since an input voltage of the S terminal of an RS F/F (flip flop circuit) 600 becomes Hi and an input voltage of the R terminal thereof becomes Lo, the output voltage of the Q terminal becomes Hi and the output voltage of the NOT circuit 283 becomes Lo. This signal Lo is applied to the NAND circuit 282 to cancel the output voltage of the oscillator 284 generating signal with an off-duty which limits a maximum on- duty ratio of the exciting current switching transistor so that the output voltage of the NAND circuit 282 becomes Hi, and the generator operates in the normal condition since it is controlled according to the comparison result of the comparator 280 which compares the divided voltage of the battery voltage (divided by the resistors r2 and r3) and the reference voltage Vref.

When the transistor 41 is commanded by the ECU 5 to turn on, the output voltage Vout of the transmitting wire becomes the ground voltage which is lower than the reference voltage Vr1 and makes the output voltage of the comparator 301 Hi, so that the output voltage of the comparator 300 becomes Lo. Since the input voltages on the terminals R and S of the RS-F/F 600 become Hi and Lo respectively, the voltage on the output terminal Q of the RS-F/F 600 becomes Lo and the output voltage of the NAND circuit 283 becomes Hi. This Hi signal is applied to the NAND circuit 282, which passes the output signal (which has the off-duty limiting the maximum on-duty of the exciting current switching transistor) of the oscillator 284. Even if the battery voltage drops and the output signal of the comparator 280 becomes 100% Hi (on-duty), the on-duty of the exciting current switching transistor of the generator is controlled by the off-duty of the oscillator 284 since the output signal of the NAND circuit 281 is controlled by the output voltage of the oscillator 284.

When both transistors 40 and 41 are commanded by the ECU 5 to turn off, the voltage of the transmitting wire Vout becomes Vout' and the output voltages of the comparators 300 and 301 become Lo. At this time, the voltages on both terminals R and S of the RS-F/F 600 become Lo and the output voltage on the terminal Q remains unchanged, thereby holding the control signal. Accordingly, the generator is controlled to generate the normal voltage or operate in the condition where the on-duty ratio of the exciting current switching transistor is limited. According to this embodiment, generation control such as gradual control of the on-duty of the exciting current by an ECU, in which increasing, reducing or holding of the duty ratio is controlled, can be carried out.

That is, when the generation control is being carried out, the ECU 5 only has to send the generator control signal to the transistor 40 or 41 to provide the R and S terminals of the RS-F/F 600 (which is the generation control signal holding circuit) with output voltages, thereby reducing the task of the ECU 5 to send the generator control signal. The generator condition signal is sent only by turning on or off the transistor 30, and is applied to the ECU 5 as the signal Hi or the signal Lo, so that the ECU 5 can monitor the generator condition all the time except during the generator control signal is transmitted. If the transmitting wire is disconnected, the resistor r40 does not function to change the voltage Vout of the terminal T to a voltage higher than the reference voltage Vre2, causing the normal generation and, therefore, preventing the battery draining. In addition, since the disconnection of the transmitting wire changes the output voltage of the comparator 400 to be Hi continuously, the disconnection can be detected by the ECU 5.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A battery charging device for a vehicle comprising:

a generator;

a voltage source;

voltage regulating means having a power switch disposed near a vehicle generator, for controlling field exciting current so that the generator output voltage can be regulated to desired voltage;

a transmitting wire;

generator control signal transmitting means, disposed remote from said vehicle generator, for providing a vehicle-side terminal of said transmitting wire with a generator control signal to control generator operating condition;

generator control signal receiving means, disposed near said vehicle generator, for receiving said generator control signal from a generator-side terminal of said transmitting wire and providing said generator output voltage regulating means with said generator control signal;

generator condition signal transmitting means, disposed near said vehicle generator, for providing a generator-side terminal of said transmitting wire with a generator condition signal to represent generating condition of said vehicle generator; and generator condition signal receiving means, disposed remote from said vehicle generator, for receiving said generator condition signal from said vehicle-side terminal of said transmitting wire;

wherein said generator control signal and said generator condition signal are combined and transmitted by the same transmitting wire.

2. A battery charging device claimed in claim 1 further comprising transmitting-wire-disconnection-detecting means having a comparator for detecting disconnection of said transmitting wire by comparison of said generator condition signal with said generator control signal.

3. A battery charging device claimed in claim 1, wherein said generator control signal transmitting means includes a load connected to said transmitting wire and an output power switch connected between said load and a voltage source.

4. A battery charging device claimed in claim 3, wherein voltage of said transmitting wire is set approximately equal to voltage of said generator control signal to control said generator in normal self-control generating condition.

5. A battery charging device claimed in claim 1, wherein said generator condition signal transmitting means comprises means, connected to said generator condition signal receiving means, for transmitting a pulse width modulation signal relative to current battery voltage.

6. A battery charging device claimed in claim 3, wherein said generator condition signal transmitting means comprises a switch for controlling said power switch of said voltage regulating means.

7. A battery charging device claimed in claim 1, wherein said generator condition signal transmitting means comprises a switch for controlling said power switch of said voltage regulating means.

8. A battery charging device claimed in claim 1, wherein
said generator control signal transmitting means comprises means connected to said transmitting wire for providing a DC voltage as said generator control signal;
said generator condition signal transmitting means comprises means for providing a PWM signal as said generator condition signal;
said generator control signal receiving means comprises means for demodulating a combined signal of said DC voltage signal and said PWM signal; and
said generator condition signal receiving means comprises means for demodulating said combined signal of said DC voltage signal and said PWM signal.

9. A battery charging device claimed in claim 1, wherein said generator control signal receiving means comprises means for holding said generator control signal.

10. A battery charging device claimed in claim 1, wherein said generator control signal receiving means comprises means for providing voltage to control said generator at normal control voltage when said transmitting wire is disconnected.

11. A battery charging device claimed in claim 1, said generator condition signal transmitting means comprises means for providing a PWM signal which corresponds to an output signal of said voltage regulating means.

12. A battery charging device claimed in claim 1, said generator condition signal transmitting means comprises means for providing a PWM signal which corresponds to an input signal of said voltage regulating means.

13. A battery charging device claimed in claim 1, wherein said generator control signal receiving means comprises means for limiting a maximum on-duty ratio of said exciting current controlled by said voltage regulating means.

14. A battery charging device claimed in claim 1, wherein said generator control signal transmitting means comprises means for transmitting a control signal to control a rate of a change in duty ratio of said exciting current.

15. A battery charging device for a vehicle comprising:
voltage regulating means disposed near a vehicle generator for controlling field exciting current;
a transmitting wire having a vehicle-side terminal and generator-side terminal;
vehicle-side generator control means disposed remote from said vehicle generator for providing said vehicle-side terminal with said generator control signal and receiving a generator condition signal corresponding to generator condition of said vehicle generator from said vehicle-side terminal; and
generator-side control means disposed near said vehicle generator for receiving said generator control signal from said vehicle-side terminal and providing said voltage regulating means with said generator control signal to control said generator condition and for providing said generator-side terminal with said generator condition signal.

16. A battery charging device for a vehicle comprising:
a battery;
a generator having a field coil for generating electric power according to field exciting current supplied to said field coil;
voltage regulator for controlling said field exciting current;
an electronic control unit for generating command signal according to vehicle condition;
a single signal transmitting wire having a vehicle-side terminal connected to said electronic control unit and a generator-side terminal;
means connected to said electronic control unit for providing said vehicle-side terminal with a control voltage signal related to said command signal;
means connected between said generator-side terminal and said voltage regulator for receiving said control signal and providing said voltage regulator with a signal related to said control signal transmitted to said generator-side terminal;
means connected to said voltage regulator for providing said generator-side terminal with a condition signal related to operation of said voltage regulator; and
means connected between said vehicle-side terminal and said electronic control unit for receiving said condition signal and providing said electronic control unit with a signal related to said condition signal.

17. A battery charging device claimed in claim 16, wherein
said control signal providing means includes a load, connected to said vehicle-side terminal, and an output power switch connected between said load and a voltage source.

18. A battery charging device claimed in claim 17, wherein
voltage of said transmitting wire is set approximately equal to voltage of said generator control signal to control said generator in normal self-control generating condition when said transmitting wire is disconnected.

19. A battery charging device claimed in claim 18, wherein said condition signal providing means comprises means connected to said generator condition signal receiving means for transmitting a pulse width modulation signal relative to current battery voltage.

20. A battery charging device claimed in claim 19, wherein said condition signal providing means provides a DC voltage signal carrying said PWM-control signal as said condition signal.

21. A battery charging device claimed in claim 17, wherein said condition signal providing means comprises an output element which composes said load.

22. A battery charging device claimed in claim 16, wherein said condition signal providing means comprises a switch for controlling said power switch of said voltage regulator.

23. A battery charging device claimed in claim 16, wherein said control signal providing means comprises means connected to said vehicle-side terminal for providing a DC voltage as said control signal;

said condition signal providing means comprises means for providing a PWM signal as said generator condition signal;

said generator control signal receiving means comprises means for demodulating a combined signal of said DC voltage signal and said PWM signal; and said condition signal receiving means comprises means for demodulating said combined signal of said DC voltage signal and said PWM signal.

24. A battery charging device claimed in claim 16, wherein said control signal receiving means comprises means for holding said control signal.

25. A battery charging device claimed in claim 23, wherein said control signal receiving means comprises means for providing voltage to control said generator at normal control voltage when said transmitting wire is disconnected.

26. A battery charging device claimed in claim 23, said condition signal providing means comprises means for providing a PWM signal which corresponds to an output signal of said voltage regulator.

27. A battery charging device claimed in claim 24, said condition signal providing means comprises means for providing a PWM signal which corresponds to an input signal of said voltage regulator.

28. A battery charging device claimed in claim 24, wherein said generator control signal receiving means comprises means for limiting a maximum on-duty ratio of said exciting current controlled by said voltage regulator.

29. A battery charging device claimed in claim 16, wherein said control signal transmitting means comprises means for transmitting a control signal to control a rate of a change in duty ratio of said exciting current.

* * * * *